(12) United States Patent
Schank

(10) Patent No.: US 8,955,792 B2
(45) Date of Patent: Feb. 17, 2015

(54) ROTOR POSITION DETERMINATION SYSTEM WITH HALL-EFFECT SENSORS

(75) Inventor: Troy C. Schank, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 153 days.

(21) Appl. No.: 13/601,077

(22) Filed: Aug. 31, 2012

(65) Prior Publication Data

US 2014/0061369 A1  Mar. 6, 2014

(51) Int. Cl.
| | |
|---|---|
| *B64C 11/02* | (2006.01) |
| *B64C 11/04* | (2006.01) |
| *B64C 27/54* | (2006.01) |
| *B64C 27/635* | (2006.01) |

(52) U.S. Cl.
USPC ...................................... 244/17.13

(58) Field of Classification Search
USPC ............. 244/17.13, 17.25; 416/1, 3, 131, 133
See application file for complete search history.

(56) References Cited

U.S. PATENT DOCUMENTS

| | | | |
|---|---|---|---|
| 4,583,862 A | 4/1986 | Ferrar et al. | |
| 4,648,345 A * | 3/1987 | Wham et al. | 114/338 |
| 5,011,373 A * | 4/1991 | Aubry et al. | 416/108 |
| 5,749,540 A * | 5/1998 | Arlton | 244/17.13 |
| 7,967,564 B1 * | 6/2011 | Andersen et al. | 416/1 |
| 8,070,090 B2 * | 12/2011 | Tayman | 244/7 C |
| 2009/0236468 A1 * | 9/2009 | Welsh | 244/17.13 |
| 2009/0278638 A1 * | 11/2009 | Giroud et al. | 335/205 |
| 2010/0230547 A1 * | 9/2010 | Tayman | 244/7 C |
| 2011/0150648 A1 * | 6/2011 | Andersen et al. | 416/61 |
| 2011/0158806 A1 * | 6/2011 | Arms et al. | 416/31 |
| 2011/0298447 A1 * | 12/2011 | Foletto et al. | 324/207.2 |
| 2012/0257847 A1 * | 10/2012 | Allred et al. | 384/221 |

FOREIGN PATENT DOCUMENTS

DE 4329521 A1 3/1995

OTHER PUBLICATIONS

European Search Report in related European Application No. 12191865.0, dated May 13, 2013, 7 pages.

* cited by examiner

*Primary Examiner* — Philip J Bonzell
(74) *Attorney, Agent, or Firm* — Bell Helicopter Textron Inc.; Christopher S. Storm

(57) ABSTRACT

According to one embodiment, a rotor system, includes a position determination system disposed between a blade and at least part of a hub. A grip couples the rotor blade to the hub. The position determination system comprises at least one magnet and a plurality of magnet sensors proximate to the at least one magnet.

17 Claims, 13 Drawing Sheets

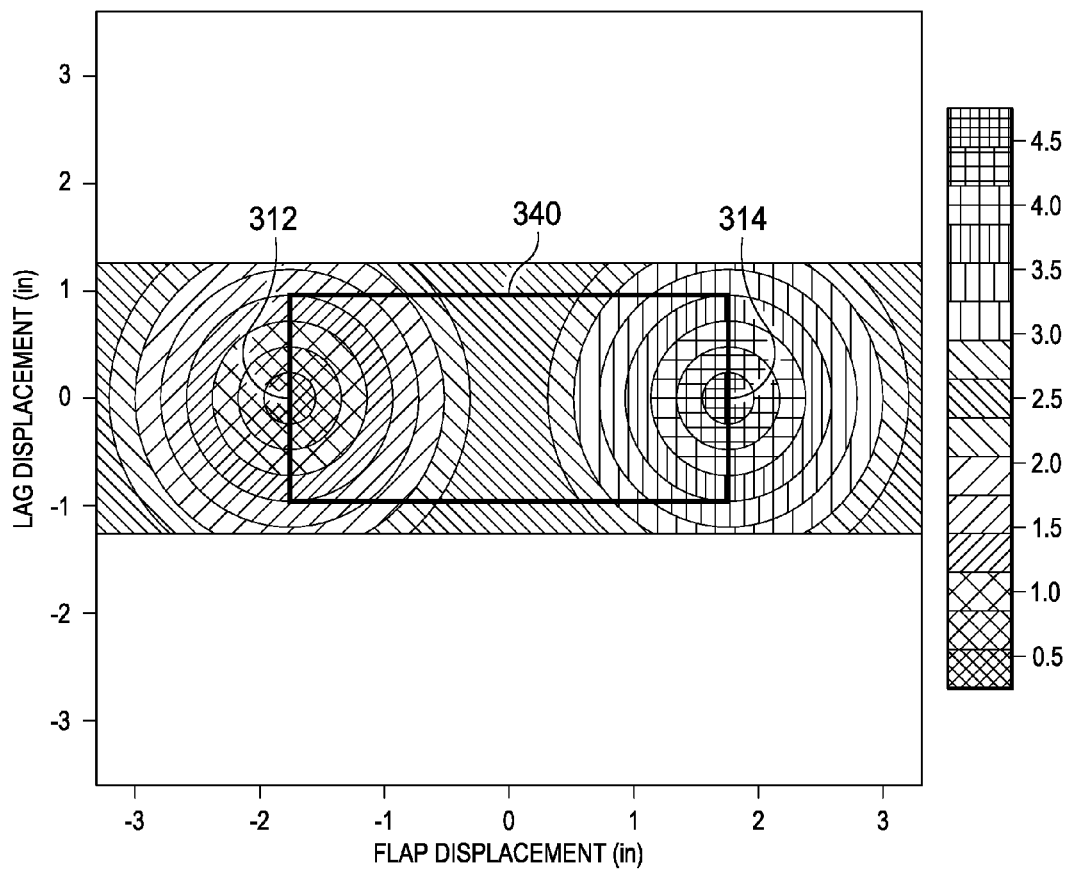

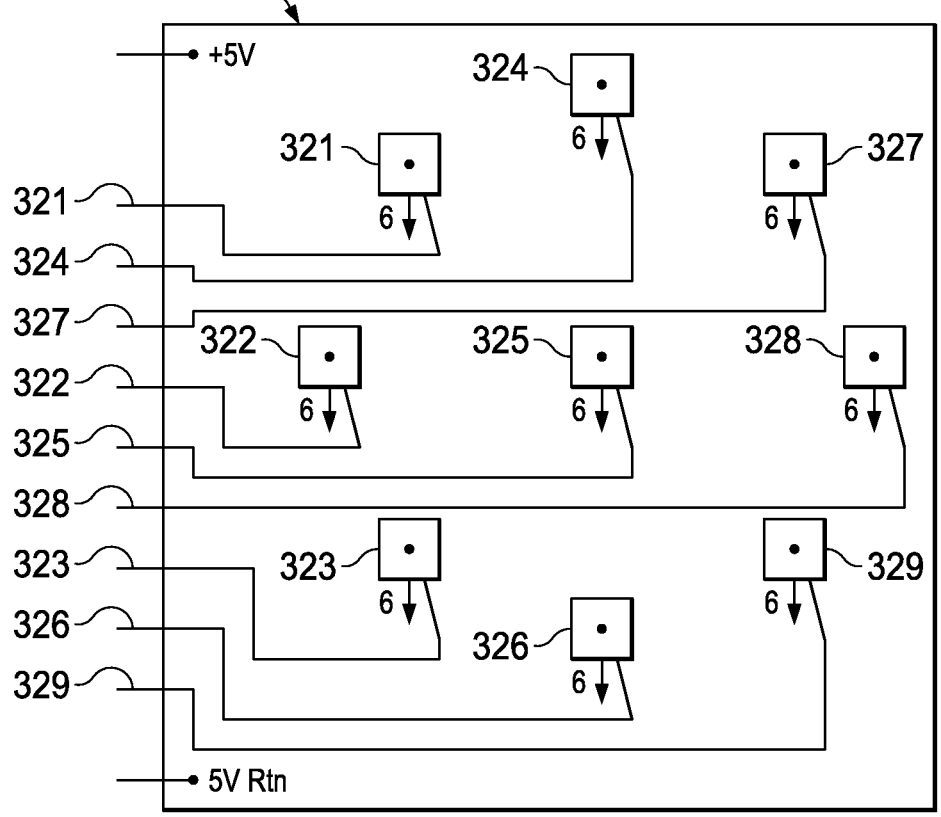

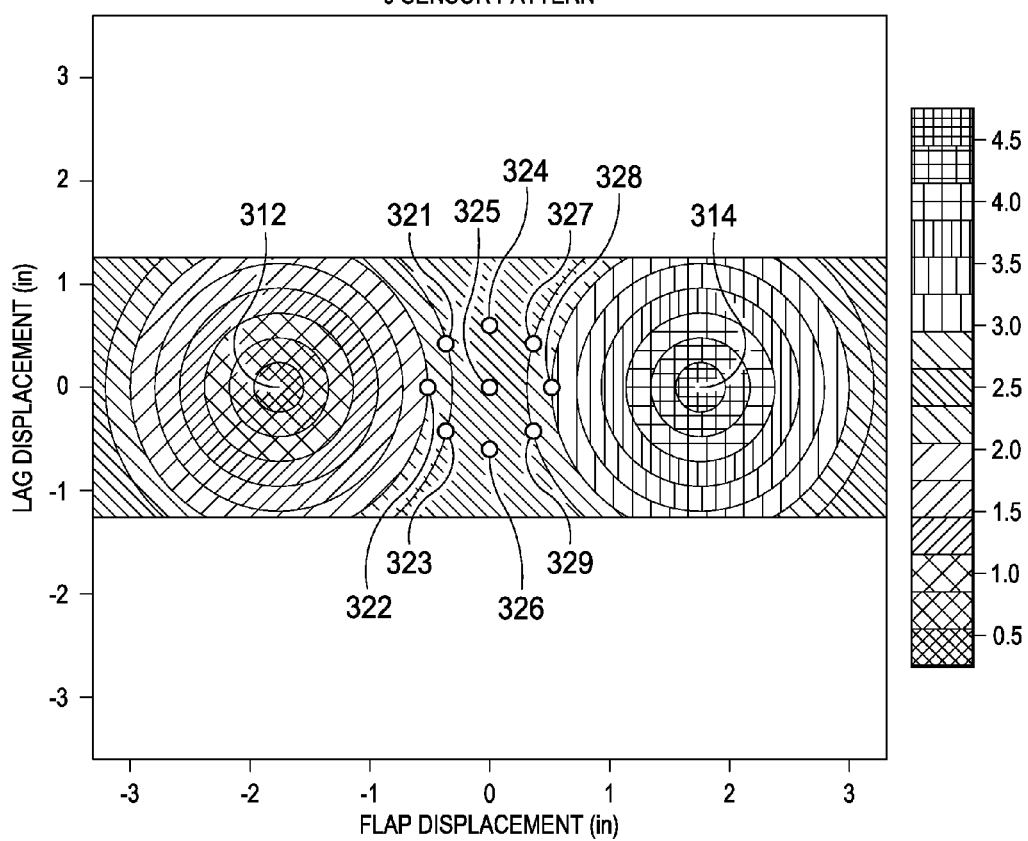

ROTOR POSITION DETERMINATION SYSTEM WITH HALL-EFFECT SENSORS

TECHNICAL FIELD

This invention relates generally to rotor systems, and more particularly, to a rotor position determination system with hall-effect sensors.

BACKGROUND

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system. A rotor system may include one or more pitch links to rotate, deflect, and/or adjust rotor blades.

SUMMARY

Particular embodiments of the present disclosure may provide one or more technical advantages. A technical advantage of one embodiment may include the capability to measure how rotor blades move in response to forces such as lead-lag forces, flapping forces, feathering forces, and centrifugal forces. A technical advantage of one embodiment may include the capability to measure displacements in six degrees of freedom, including axial (spanwise) direction. A technical advantage of one embodiment may include the ability to detect degradation of elastomeric components of a rotor system by measuring spanwise displacements as they change over time. A technical advantage of one embodiment may include the capability to measure these displacements during operation of the rotorcraft and outside of a test environment.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 7B shows a three-dimensional view of the voltage output of the Hall-effect sensors of FIG. 5B when the Hall-effect sensors or FIG. 5B are proximate to the magnets of FIG. 5A;

FIG. 7C shows a two-dimensional topography map of the three-dimensional voltage output graph shown in FIG. 7B;

FIG. 8 shows an array of the Hall-effect sensors of FIG. 5B according to one example embodiment;

FIG. 9 shows the array of Hall-effect sensors of FIG. 8 situated over the two-dimensional topography map of FIG. 7C.

DETAILED DESCRIPTION OF THE DRAWINGS

Figure 1:
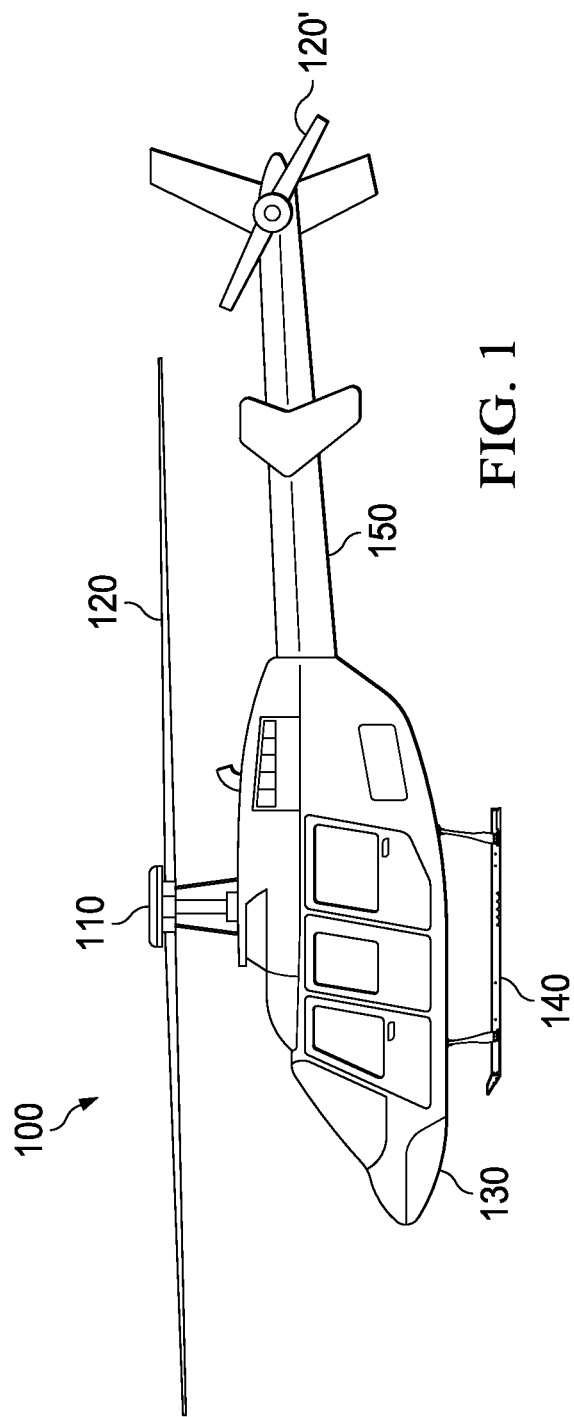
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings from rotorcraft 100 may apply to aircraft other than rotorcraft, such as airplanes and unmanned aircraft, to name a few examples.

Figure 2:
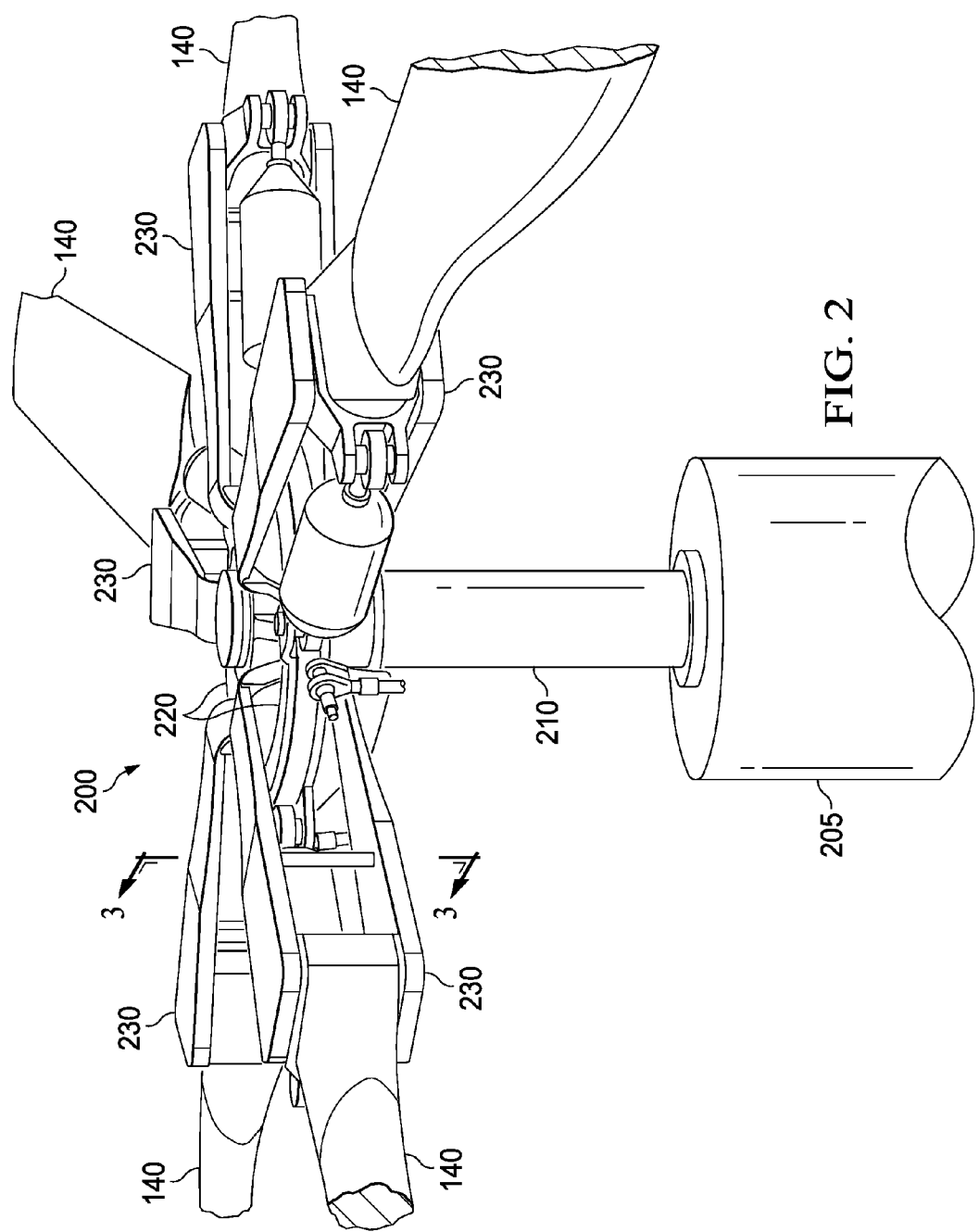
FIG. 2 shows the rotor system and blades of the rotorcraft of FIG. 1 according to one example embodiment.

FIG. 2 shows a rotor system 200 according to one example embodiment. Rotor system 200 may represent one example of rotor system 110 of FIG. 1. Rotor system 200 features a drive train 205, a drive shaft 210, a hub 220, and grips 130 coupled to blades 140. In some examples, rotor system 200 may include more or fewer components. For example, FIG. 1 does not show components such as a gearbox, a swash plate, drive links, drive levers, and other components that may be incorporated.

Power train 205, drive shaft 210, and hub 220 are mechanical components for generating and transmitting torque and rotation. Power train 205 may include a variety of components, including an engine, a transmission, and differentials. In operation, drive shaft 210 receives torque or rotational energy from power train 205 and rotates hub 220. Blades 140 are coupled to hub 220 by grips 230. Rotation of hub 220 causes grips 230 and blades 140 to rotate about drive shaft 210.

As will be explained in greater detail below, grips 230 and blades 140 may be subject to a variety of different forces. For example, rotation of grips 230 and blades 140 may result in a centrifugal (CF) force against grips 230 and blades 140 in a direction away from drive shaft 210. In addition, the weight of grip 230 and blade 140 may result in a transverse force being applied against grip 230.

Figure 3:
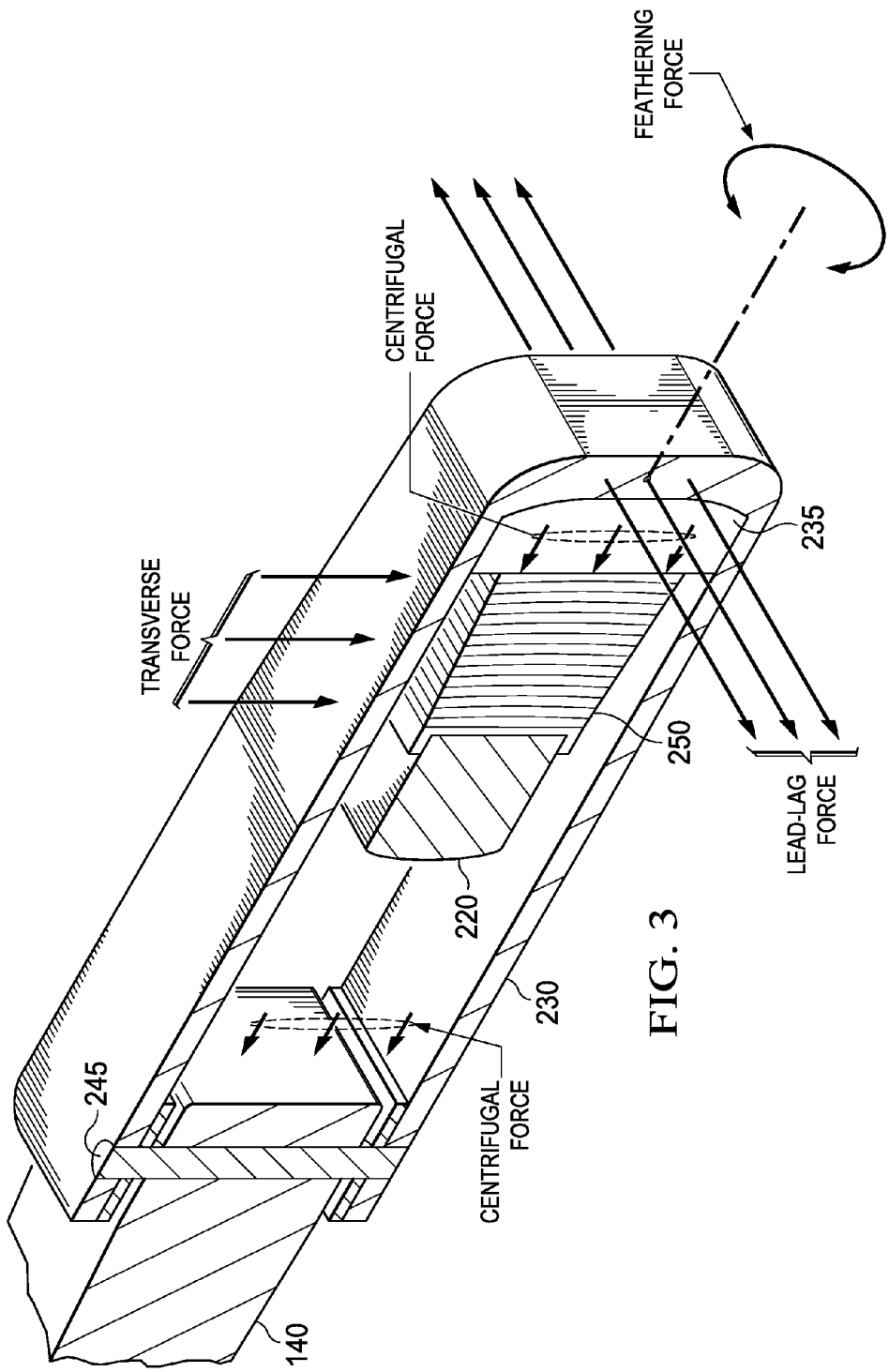
FIG. 3 shows a cross-section of a grip during operation of the rotor system of FIG. 2.

FIG. 3 shows a cross-section of a grip 130 of FIG. 2 during operation of rotor system 200. As shown in FIG. 3, blade pin 245 couples blade 140 to grip 230. In addition, bearing mount 235 and elastomeric bearing 250 separate hub 220 from grip 230.

Bearing mount 235 provides a surface for supporting elastomeric bearing 250. In some embodiments, bearing mount 235 is formed from a metallic material such as titanium. Elastomeric bearing 250 separates bearing mount 235 from hub 220. Elastomeric bearing 250 is formed from an elastomeric material. An elastomeric material is a material, such as a polymer, having the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing). Elastomeric materials may absorb energy during compression but may also be prone failure during tension and torsion.

In operation, elastomeric bearing 150 may be subject to centrifugal forces, transverse forces, and feathering forces. For example, rotation of blade 140 about driveshaft 210 results in a centrifugal force against blade pin 245 in a direction away from driveshaft 210. Blade pin 245 transfers the centrifugal force to grip 230, which then transfers the centrifugal force to elastomeric bearing 250 through bearing mount 235. Because elastomeric bearing 250 is positioned between bearing mount 235 and hub 220, the centrifugal force caused by rotation of blade 140 results in compression of elastomeric bearing 250.

Elastomeric bearing 250 may have a cross-sectional area that increases from hub 220 to bearing mount 235. In operation, elastomeric bearing 250 may be subject to compression between hub 220 and bearing mount 235. Having an increasing cross-sectional area may allow elastomeric bearing 250 to absorb and dissipate compression forces.

Elastomeric bearing 250 is also subject to transverse, lead-lag, and feathering forces. For example, the weight of grip 230 and blade 140 results in a transverse force being applied against elastomeric bearing 250. In addition, blades 140 may not rotate precisely with hub 220, resulting in a lead-lag force being applied against elastomeric bearing 250. Furthermore, twisting of grip 230 and blade 140 during operation may result in a feathering force being applied to elastomeric bearing 250.

Teachings of certain embodiments recognize the capability to measure how blade 140 moves in response to these forces. In addition, teachings of certain embodiments recognize the ability to measure the degradation of various components, such as elastomeric bearing 250. Teachings of certain embodiments recognize the capability to measure these displacements during operation of the rotorcraft and outside of a test environment.

By measuring how blade 140 moves, rotor system 200 may be tested for various instabilities, loads, and vibrations. Teachings of certain embodiments also recognize the capability to decouple the lead-lag, flapping, and feathering displacements, which can be difficult when these displacements center about a common point, as with articulated rotors with a single elastomeric bearing 250.

In addition, measuring during operation of the rotorcraft increases the amount data available as compared to only measuring in a test environment. Furthermore, measuring during operation may allow maintenance crews to determine whether parts need replacement based on the strains and stresses they have experienced during operation. For example, measuring during operation may allow for accurate prediction of when elastomeric bearing 250 should be replaced. Such functions may be incorporated as part of an integrated vehicle health management (IVHM) system that monitors vehicle usage. In addition, measuring during operation of the aircraft may allow for accurate determinations of fatigue usage credits.

Furthermore, measuring during operation may provide accurate real-time data to active damping and stabilization systems. For example, an active lead-lag damper may increase dampening in response to measured movements of blade 140. Teachings of certain embodiments also recognize the capability to provide measurements for feedback systems for loads control and flight trim optimization. In addition, teachings of certain embodiments recognize the capability to provide information to a pilot during operation of a rotorcraft, such as information alerting the pilot when blade movement exceeds a predetermined threshold.

Figure 4A:
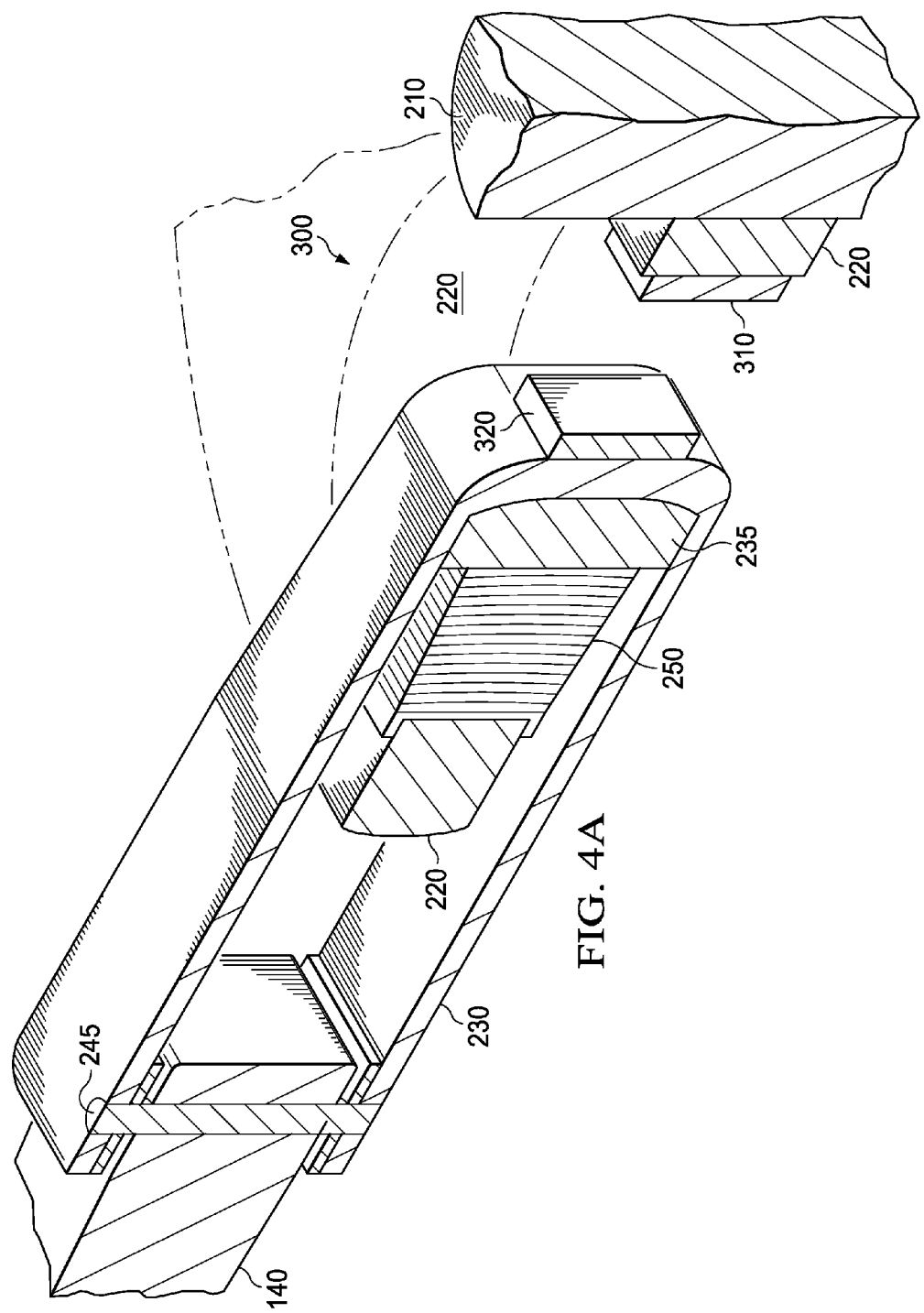
FIG. 4A shows the grip of FIGS. 2 and 3 equipped with a position determination system according to one example embodiment.
Figure 4B:
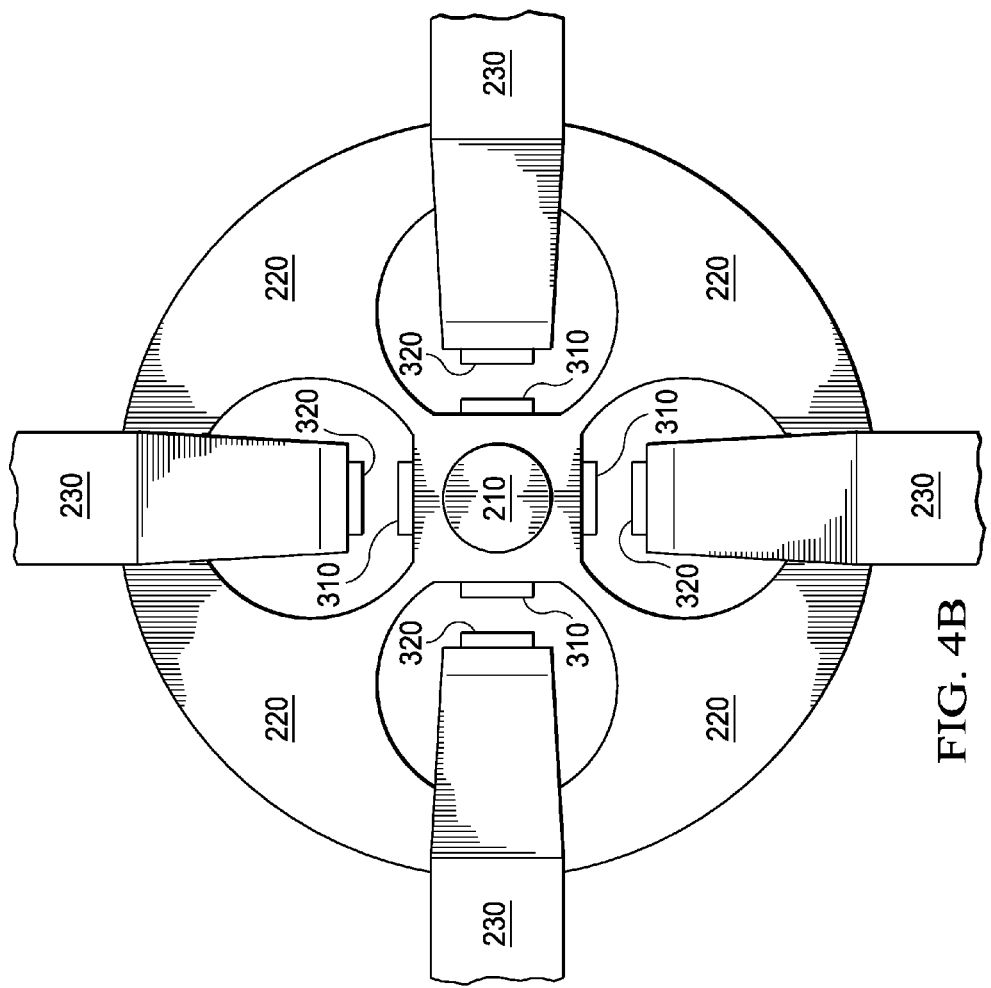
FIG. 4B shows a cross-section of the hub of the rotor system of FIG. 2 equipped with the position determination system of FIG. 4A.

FIGS. 4A and 4B show rotor system 200 equipped with a position determination system 300. FIG. 4A shows a cross-section of grip 230 equipped with position determination system 300, and FIG. 4B shows a cross-section of hub 220 equipped with position determination system 300. In the examples of FIGS. 4A and 4B, position determination system 300 features magnets 310 and an array of sensors 320.

Magnets 310 may include any material that produces a magnetic field. A magnetic field represents the magnetic influence of a magnet on electric currents and other magnetic materials. Examples of magnets 310 may include, but are not limited to, ferromagnetic materials, composite magnetic materials, rare-earth magnets, and electromagnets.

In the example of FIGS. 4A and 4B, sensors 320 are Hall-effect sensors. Hall-effect sensors are transducers that vary their output voltage in response to a magnetic field. In the example of FIGS. 4A and 4B, each sensor 320 may vary its output voltage based on the magnetic field produced by magnets 310. Because the magnetic field produced by magnets 310 is stronger near magnets 310 and weaker away from magnets 310, the value of the voltage output of each sensor 320 may depend on its proximity to magnets 310. In this manner, each voltage output from sensors 320 may indicate the position of magnets 310 from sensors 320.

In some embodiments, other sensors may be used in place of and/or in addition to sensors 320. One example would be a magneto resistive bridge sensor which measures the magnetic flux orientation, rather than the magnetic flux magnitude. This sensor type operates in saturation mode, and can allow for larger changes in magnetic flux strength. This may enable various advantages for the intelligent sensor system, such as the use of smaller and/or fewer magnets to generate the field through which the sensor array operates.

In yet an alternative embodiment, the field and sensor type may be some type other than magnetic in nature. For example, the field could be optical, generated by a light source such as an LED or laser. The sensor array would likewise sense either the magnitude or orientation of the light field permeating from the source in 3D space. Certain advantages may be obtained from an optical medium such as greater allowable distance between the field source and the sensor arrays compared to a magnetic based field and array system.

An alternative embodiment would include a hybrid sensor array consisting of two or more sensor types. For example, a hybrid magnetic sensor array may have sensors that detect magnetic strength (Hall-type) and magnetic flux orientation (magneto-resistive). Certain advantages may be obtained from a hybrid sensor array of this type such as reduced magnetic field requirements and increased sensor system accuracy or precision. In another hybrid embodiment, one or more field and/or sensor types could be used in combination. For example, a magnetic sensor could be used in combination with an optical sensor to detect a combined magnetic and optical field combination. This combination might allow certain advantages such as higher accuracy and precision with certain allowance for optical contamination.

In the example of FIGS. 4A and 4B, magnets 310 and sensors 320 are disposed between hub 220 and blade 140. In particular, magnets 310 are coupled to hub 220, and sensors 320 are coupled to grip 230, which couples blade 140 to hub 220. In an alternative embodiment, sensors 320 are coupled to hub 220 instead of magnets 310.

The example of FIGS. 4A and 4B may resemble how magnets 310 and sensors 320 may be used in an articulated rotor system. In some embodiments, however, magnets 310 and/or sensors 320 may be disposed in alternative locations to measure the position of blades 140. In addition, teachings of certain embodiments recognize that magnets 310 and sensors 320 may be used in rotor systems other than an articulated rotor system. As one example, magnets 310 and sensors 320 may be used in a gimbaled rotor system, such as used in some tilt-rotor aircraft. Unlike an articulated rotor, a gimbaled rotor may not have relative motion between the blades and the yoke. In this example, the relative motion may be between the rotor system and the rotor mast. In such an example, magnets 310 and sensors 320 may be disposed between the rotor system and the rotor mast so as to measure relative motion.

Figure 5A:
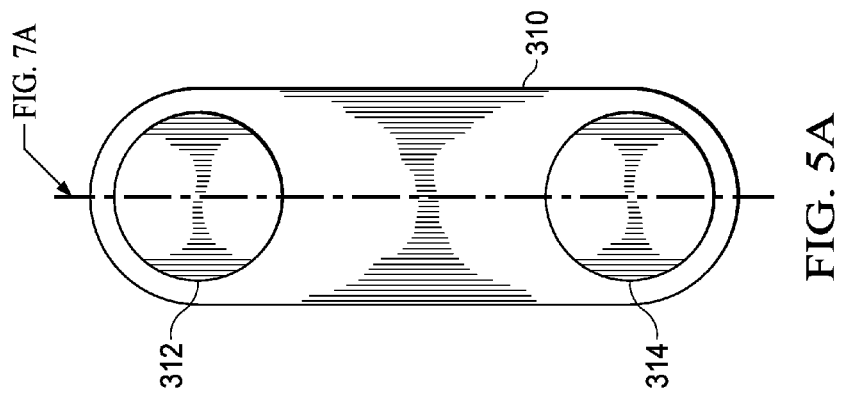
FIG. 5A shows magnets of the position determination system of FIG. 4A according to one example embodiment.

FIG. 5A shows magnets 310 according to one example embodiment. In the example of FIG. 5A, magnets 310 include a magnet 312 and a magnet 314. As will be explained in greater detail below, providing two or more magnets 310 may allow position determination system 300 to determine the location of magnets 310 in up to six dimensions, including the following four germane to articulated rotors: left-right relative to sensors 320 (indicative of lead-lag displacement), up-down relative to sensors 320 (indicative of transverse displacement), distance away from sensors 320 (indicative of CF displacement), and rotation of magnets 310 (indicative of feathering displacement). In some embodiments, however, more or fewer magnets 310 may be used.

Figure 5B:
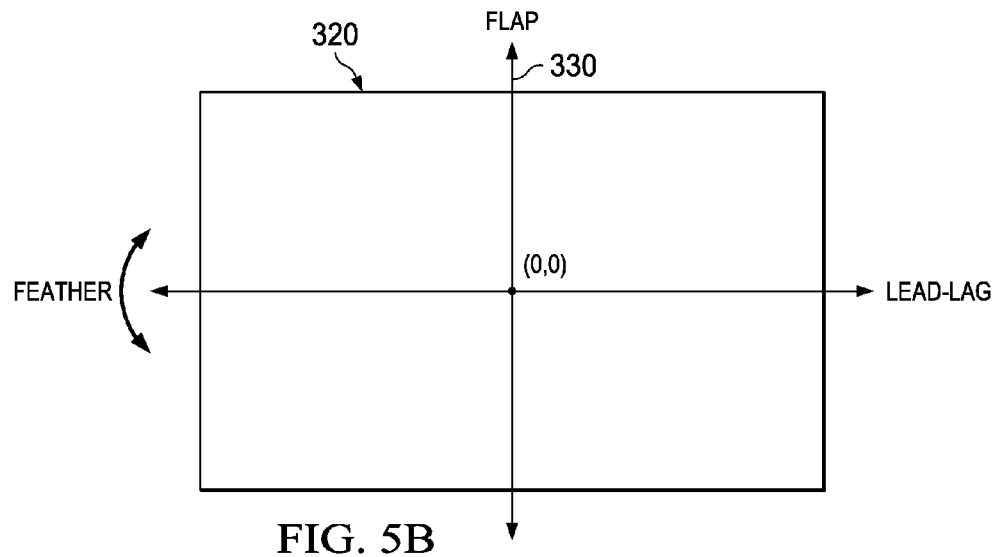
FIG. 5B shows Hall-effect sensors of the position determination system of FIG. 4A according to one example embodiment.

FIG. 5B shows a coordinate 330 of sensors 320. Coordinate 330 features an x-axis (indicative of lead-lag displacement) and a y-axis (indicative of transverse displacement). Rotation within coordinate 330 may be indicative of feathering displacement. Not shown in FIG. 5B is a coordinate axis indicative of CF displacement, which will be explained in greater detail below.

Figure 6A:
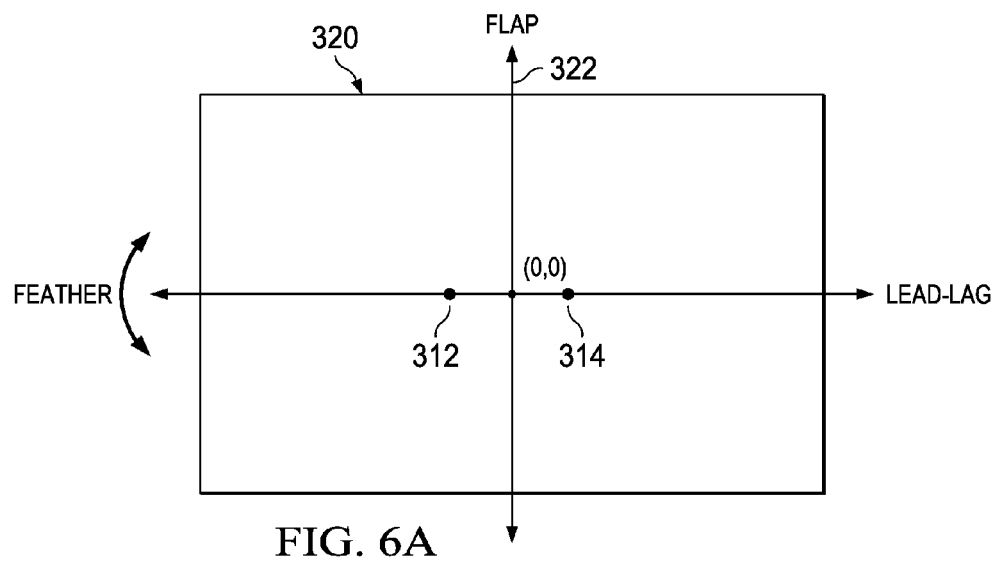
FIGS. 6A-6D shows relative positions of the magnets of FIG. 5A to the Hall-effect sensors of FIG. 5B during various stages of operation of the rotor system of FIG. 2.

Voltage outputs from sensors 320 may be used to plot the locations of magnets 320 on coordinate 330. For example, FIG. 6A shows magnets 312 and 314 in a neutral position. Defining a neutral position of magnets 312 and 314 may be useful in identifying relative displacements of blade 140.

Figure 6B:
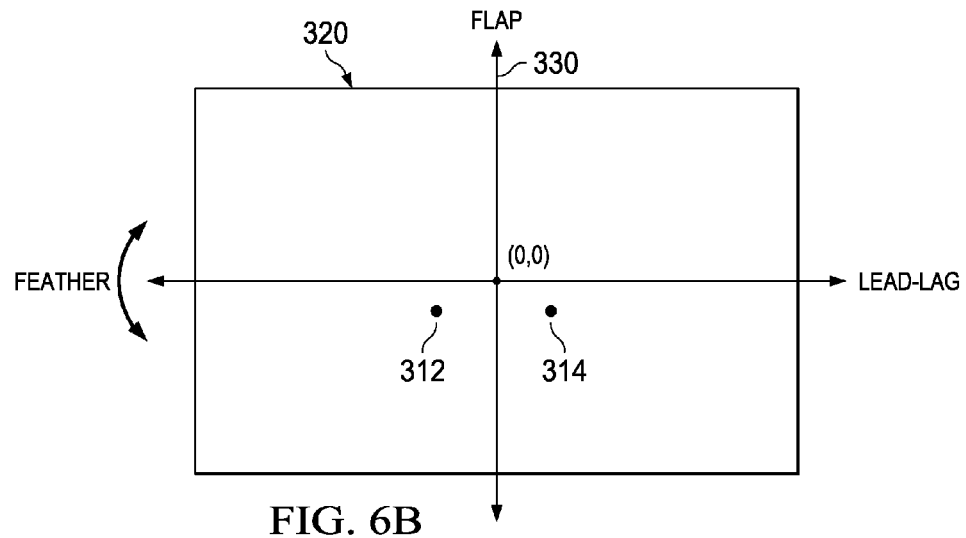
Figure 6C:
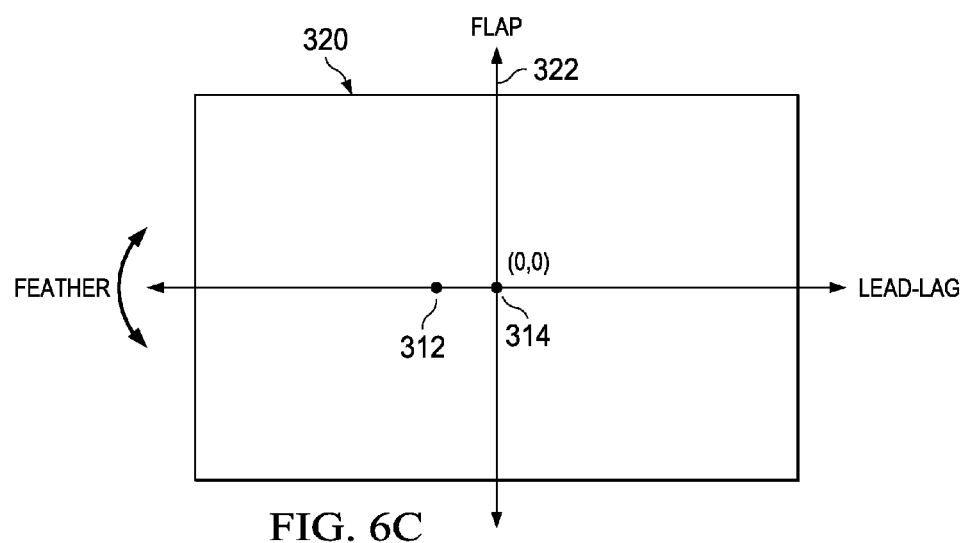
Figure 6D:
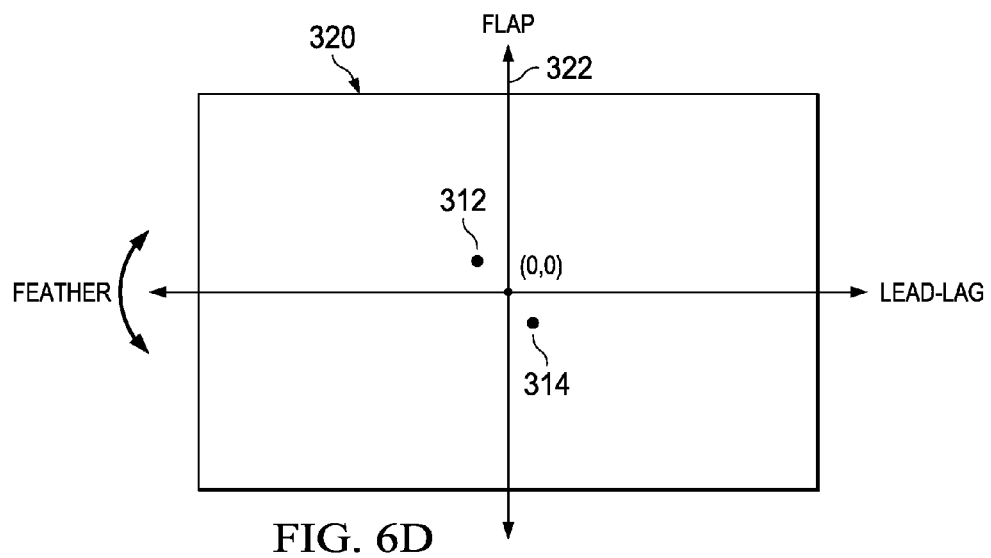

For example, as blade 140 flap upwards, magnets 312 and 314 are pushed downwards, as shown in FIG. 6B. As another example, as blade 140 lags behind rotation of hub 220, magnets 312 and 314 move to the left of coordinate 330, as shown in FIG. 6C. As blade 140 rotates, or feathers, magnets 312 and 314 rotate relative to coordinate 330, as shown in FIG. 6D. Thus, by determining the location of magnets 312 and 314 relative to coordinate 330, the flapping, lead-lag, and feathering displacements may be determined.

In the examples of FIGS. 6A-6D, magnets 312 and magnets 314 are plotted relative to coordinate 330. Teachings of certain embodiments recognize the capability of sensors 320 to uniquely identify magnets 310 so as to distinguish magnet 312 from magnet 314. For example, teachings of certain embodiments recognize that magnets 310 may be uniquely identified if magnets 312 and 314 produce different magnetic fields.

Figure 7A:
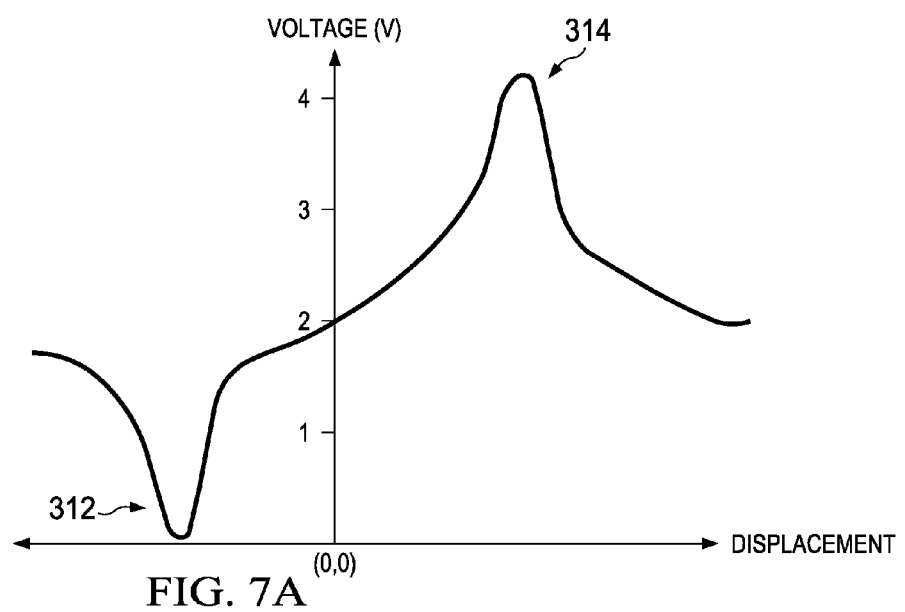
FIG. 7A shows a graph of the voltage output of the Hall-effect sensors of FIG. 5B due to the magnetic fields of the magnets of FIG. 5A along a cross-section line indicated on FIG. 5A.

FIG. 7A shows a graph of the voltage output of sensors 320 along a cross-section of the magnetic fields of magnets 312 and 314 according to one example embodiment. The position of this cross-section is shown in FIG. 5A. As shown in the graph of FIG. 7A, magnet 312 produces a magnetic field that decreases the output voltage of sensors 320, and magnet 314 produces a magnetic field that increases the output voltage of sensors 320. Thus, magnets 312 and 314 may be uniquely identified based on how they change the output voltage of sensors 320. The different magnetic fields produced by magnets 312 and 314 may be the result of, for example, one magnet having its north pole proximate to sensors 320, and the other magnet having its south pole proximate to sensors 320. In an alternative embodiment, magnets 312 and 314 represent the north and south poles of the same magnetic material or electromagnet.

Figure 7B:
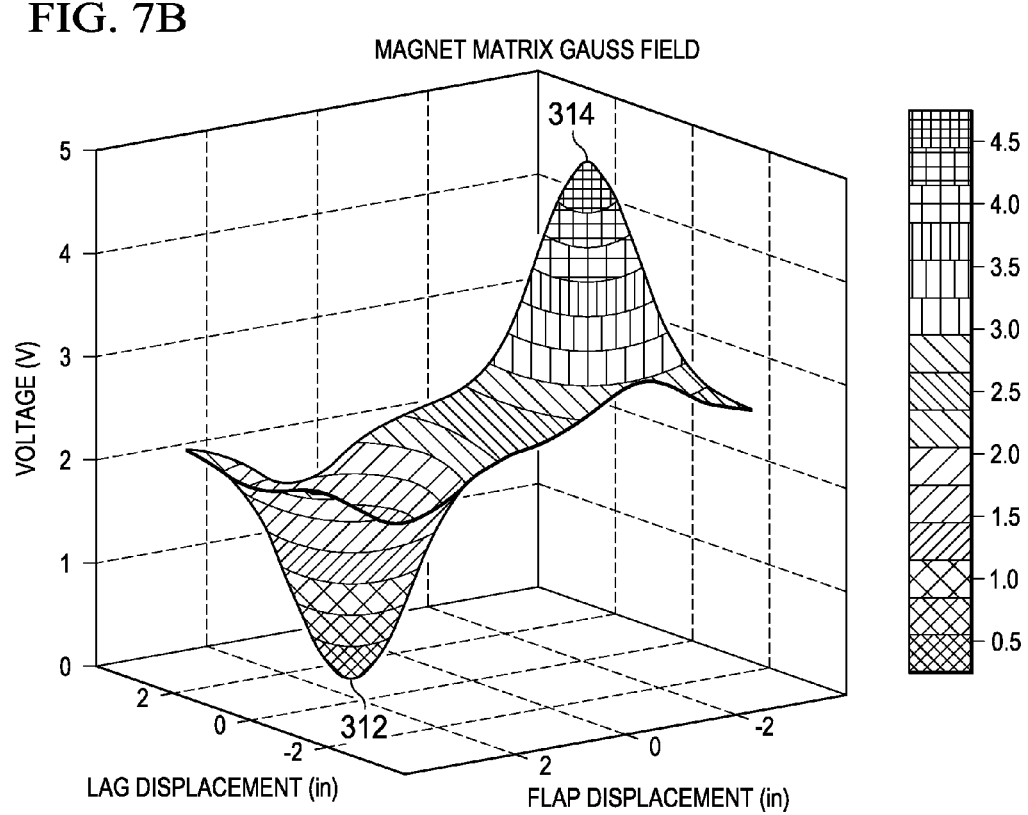

FIG. 7B shows a three-dimensional view of the voltage output of sensors 320 when sensors 320 are proximate to magnets 312 and 314. As shown in FIG. 7B, the absolute value of the voltage change increases closer to magnets 312 and 314.

FIG. 7C shows a two-dimensional topography map of the three-dimensional voltage output graph shown in FIG. 7B. Area 340 represents the full range of motion of sensors 320 relative to magnets 312 and 314 according to one example embodiment. Every location within area 340 may correspond to a specific voltage output due to the magnetic fields of magnets 312 and 314.

In some instances, multiple locations within area 340 may correspond to the same voltage output. For example, voltage at (1,1) is the same as at (1,−1) because these positions represent opposite sides of the magnetic field of magnet 314. Thus, if there was only one sensor (such as one Hall-effect sensor), it may not be clear whether the sensor is located at (1,1) or (1,−1) based on its voltage output alone. Teachings of certain embodiments recognize, however, that an array of sensors 320 may uniquely identify the position of magnets 310 relative to sensors 320 based on the voltage output of each sensor 320 to form a coordinated output signature.

FIG. 8 shows an array of sensors 321-329 according to one example embodiment. FIG. 9 shows the array of sensors 321-329 of FIG. 8 situated over the two-dimensional topography map of FIG. 7C. Returning to the previous example, sensor 329 may have an output voltage that corresponds to multiple positions (e.g., (1,1) and (1,−1)). In this example, the position of sensor 329 relative to magnets 310 may be determined based on the voltage outputs of sensors 321-328 and the distances between sensors 321-329. Thus, teachings of certain embodiments recognize the ability to determine the unique position of two or more magnets 310 relative to an array of sensors 320. In addition, as explained above with regard to FIGS. 6A-6D, the lead-lag position, flapping position, and feathering position of blade 140 may be determined by determining the unique position of one or more magnets 310 relative to the array of sensors 320.

In addition to determining the lead-lag position, flapping position, and feathering position of blade 140, an array of sensors may also determine the CF position of blade 140. As explained above with regard to FIG. 7B, the absolute value of the voltage change increases closer to magnets 312 and 314 and decreases away from magnets 312 and 314. Thus, the magnitude of the voltage measurements from the array of sensors 321-329 may identify the distance between magnets 310 and sensors 320. This distance between magnets 310 and sensors 320 may reflect how far grip 230 has moved as a result of compression of elastomeric bearing 250 due to CF forces.

As stated throughout, sensors 320 may determine the location and position of blade 140 by determining the location and position of magnets 310. To do so, sensors 320 may detect magnetic fields from magnets 310 and change their output voltages in response to the detected magnetic fields. Teachings of certain embodiments recognize the capability to measure the location and position of blade 140 based on the output voltages of each sensor 320.

Figure 10:
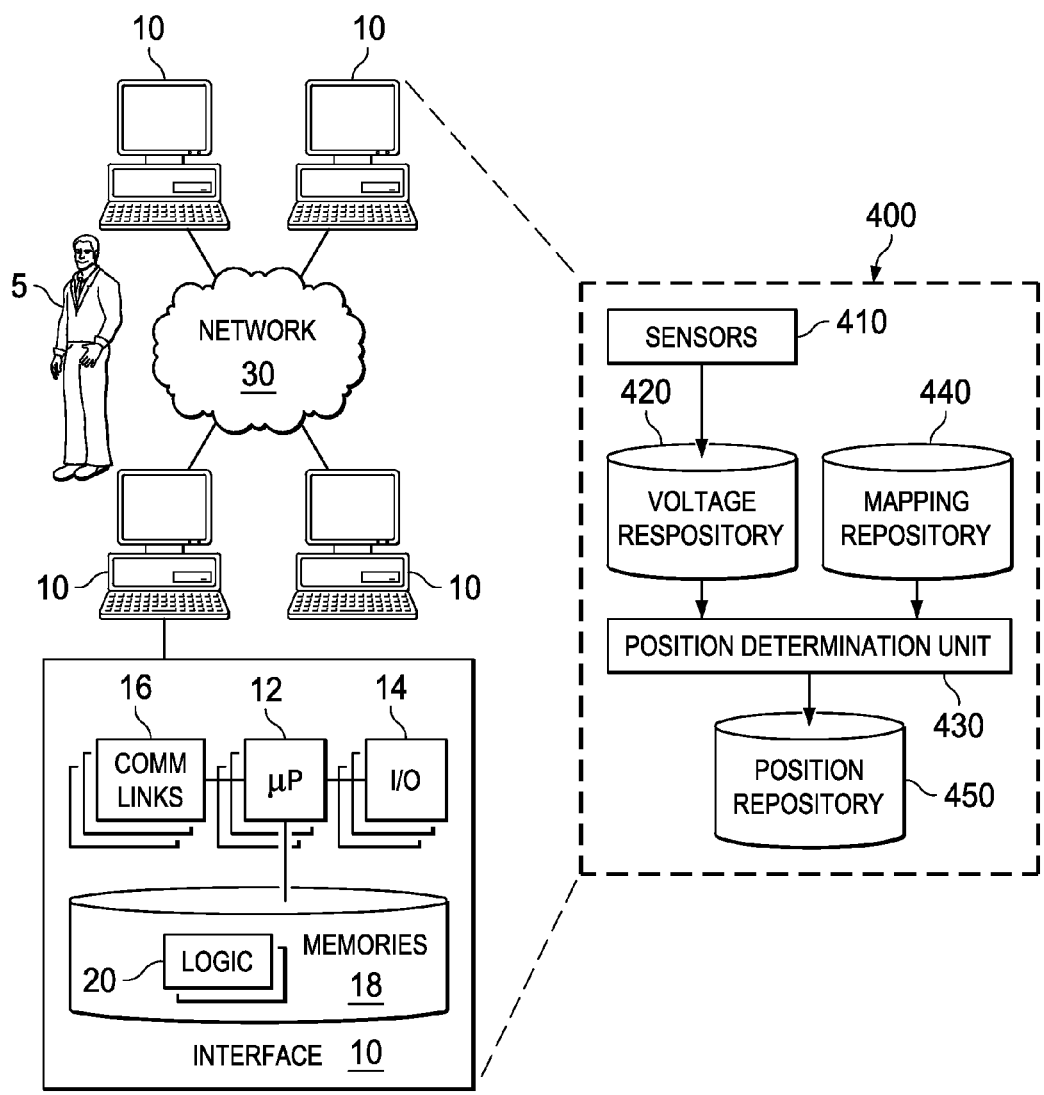
FIG. 10 shows a position measurement system according to one example embodiment.

FIG. 10 shows a position measurement system 400 according to one embodiment. In general, system 400 features sensors 410, a voltage repository 420, a position determination unit 430, a mapping repository 440, and a position repository 450, that may be implemented by one or more computer systems 10.

All, some, or none of the components of system 400 may be located on or near rotorcraft 100. For example, in one example embodiment, sensors 410 are incorporated into rotor system 200, voltage repository 420 may be located elsewhere on fuselage 130, and position determination unit 430, mapping repository 440, and position repository 450 may be located remotely from rotorcraft 100.

Users 5 may access system 100 through computer systems 10. For example, in some embodiments, users 5 may access voltage repository 420, mapping repository 440, and/or position repository 450 through computer systems 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Sensors 410 represent sensors that detect a topography and output one or more signals that reflect that topography. In one example embodiment, sensors 410 are Hall-effect sensors that detect a magnetic topography that is the result of magnetic fields produced by one or more magnets. In this example embodiment, sensors 410 vary an output voltage in response to the detected magnetic topography. One example of sensors 410 may include sensors 320 of position determination system 300.

Voltage repository 420 stores measurements of the output voltages from sensors 410. In some embodiments, voltage repository 420 may store a set of voltages representative of the topography detected by sensors 410. For example, the array of sensors 321-329 may output nine voltages that represent a magnetic topography, and voltage repository 420 may store the measurements of each output voltage. If sensors 410 collect multiple measurements over time, voltage repository 420 may store each set of voltages with a time stamp.

Position determination unit 430 converts the voltage values stored in voltage repository 420 into displacements in three-dimensional space. For example, in one embodiment, position determination unit 430 determines an x-axis displacement and rotation, a y-axis displacement and rotation, and a z-axis displacement and rotation from the topography detected by sensors 410.

In some embodiments, position determination unit 430 compares stored voltage measurements from voltage repository 420 to stored voltage combinations from mapping repository 440. Mapping repository 440 stores a plurality of mapping voltage records. Each mapping voltage record includes one or more voltage values and a location corresponding to those voltage values. As one example, each mapping voltage record may identify nine voltage measurements and a corresponding location of magnets 310. In this example, the nine voltage measurements reflect what voltage measurements from the array of sensors 321-329 would be if magnets 310 were located at the corresponding location identified in the mapping voltage record.

Mapping repository 440 may include multiple mapping voltage records. For example, mapping repository 440 may include multiple mapping voltage records identifying what the voltage measurements from the array of sensors 321-329 would be if the sensors were located at a variety of different positions within area 340.

Mapping repository 440 may be populated with mapping voltage records in a variety of ways. In one example embodiment, blade 140 is moved in a variety of positions, and the voltages from sensors 320 is recorded at each position along with the location of magnets 310 relative to sensors 320.

In some embodiments, mapping repository 440 may be populated using a learning tool, such as an Artificial Neural Network (ANN) tool. An ANN may represent a mathematical model or computational model that is inspired by the structure and/or functional aspects of biological neural networks. An ANN may include of an interconnected group of artificial neurons and may process information using a connectionist approach to computation. In some cases, an ANN is an adaptive system that changes its structure based on external or internal information that flows through the network during the learning phase.

In some circumstances, an ANN may be configured for learning. In one example, given a specific task to solve, and a class of functions F, the ANN may learn by using a set of observations to find $f^* \in F$, which may solve the task in some optimal sense.

The ANN tool may identify relationships between coordinated sensor outputs and positions. For example, the mapping repository 440 may be populated by arranging the magnets and sensors in a multitude of known positions, recording the sensor outputs at those positions, and then determining relationships between sensor outputs and positions such that positions may be calculated for new sensor outputs that do not exactly match the recorded sensor outputs. In some embodiments, the relationships may be represented by one or more equations that express all or some of the travel range of the magnets/sensors on one or more axis based on the recorded sensor outputs and their corresponding positions.

The ANN tool may capture complex relationships between previous sensor outputs and known positions such that the ANN tool can calculate the position for a new sensed topography based on these relationships. For example, in some circumstances, basic interpolation may not be practical with multiple sensors, but the ANN tool may determine the position for a new sensed topography based on the complex relationships between previous sensor outputs and known positions.

Position determination unit 430 may determine the location of magnets 310 by comparing the stored measurements from voltage repository 420 to one or more of the mapping voltage records from mapping repository 440. In one example embodiment, position determination unit 430 identifies the mapping voltage record having voltages closest to the stored measurements from voltage repository 420 and then selects the location identified in the identified mapping voltage record. In another example embodiment, position determination unit 430 selects multiple mapping voltage records and then interpolates between them to identify a more accurate location for the stored measurements from voltage repository 420. For example, position determination unit 430 may apply a non-linear curve fit to the mapping voltage records and then compare the stored measurements from voltage repository 420 to find the location corresponding to the stored measurements. In some embodiments, position determination unit 430 may use a learning tool, such as an ANN tool, to find the location corresponding to the stored measurements.

In one example embodiment, position determination unit 430 determines the location of magnets 310 relative to sensors 320 by filtering through mapping voltage records of mapping repository 440. For example, by comparing the voltage measurement from sensor 329 to the mapping voltage records, many of the voltage mapping records may be eliminated from consideration as being too far away from the voltage measurement from sensor 329.

In another example embodiment, position determination unit 430 determines the location of magnets 310 relative to sensors 320 by determining location one axis at a time. For example, position determination unit 430 may start by determining the flap position of magnets 310 (along the y-axis of coordinate system 330). Next, position determination unit 430 may determine the feathering position of magnets 310. Position determination unit 430 may then determine the lag position of magnets 310 (along the x-axis of coordinate system 330). Teachings of certain embodiments recognize that determining location one axis at a time may provide for more accurate results. For example, determining flap position first may reduce the number of possible feathering positions, which may in turn allow for a more accurate determination of the feathering position of magnets 310.

In this example embodiment, position determination unit 430 may determine the location of magnets 310 relative to sensors 320 using an ANN tool. In this example, the ANN tool may not be capable of accurately expressing the position measurement over the entire range in a single equation. Accordingly, teachings of certain embodiments recognize the capability to break the travel range down into smaller region, each with its own ANN equation. The determination of which equation to use may depend on the determined position along certain axes. Returning to the previous example, position determination unit 430 may start by determining the flap position of magnets 310 (along the y-axis of coordinate system 330) in an effort to determine which equation to use to determine the feathering position of magnets 310, and so on.

Thus, teachings of certain embodiments recognize the capability of position determination unit 430 to determine a location based on signals from sensors 410 (e.g., the location of magnets 310 relative to sensors 320 based on voltage measurements from sensors 320). Position determination unit 430 may also determine the location of blade 140. In one example, position determination unit 430 determines the location of magnets 310 relative to sensors 320 and then maps this location to a corresponding location of blade 140. In another example embodiment, the mapping voltage records stored by mapping repository 440 map voltage measurements to corresponding locations of blade 140. In this second example, position determination unit 430 may determine a location of magnets 310, a location of blade 140, or both locations. In some embodiments, position determination system 300 is coupled relative to blade 140 such that a known relationship exists between the location of blade 140 and the location of magnets 310 relative to sensors 320.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft coupled to the power source;
   a hub coupled to the drive shaft;
   a rotor blade;
   a grip coupling the rotor blade to the hub; and
   a position determination system disposed between the rotor blade and the body, the position determination system configured to measure a flapping of the rotor blade, the flapping of the rotor blade representing a vertical displacement of the rotor blade during operation, the position determination system comprising:
   at least one magnet;
   a plurality of magnet sensors proximate to the at least one magnet;
   wherein the grip is positioned around a portion of the hub;
   the grip has a closed end and an open end; and
   the position determination system is disposed between the closed end of the grip and the at least part of the hub.

2. The rotorcraft of claim 1, wherein the plurality of magnet sensors comprise a plurality of Hall-effect sensors.

3. The rotorcraft of claim 1, wherein the position determination system comprises at least two magnets.

4. The rotorcraft of claim 1, wherein the position determination system is disposed between the rotor blade and at least part of a hub, wherein a grip couples the rotor blade to the hub.

5. The rotorcraft of claim 1, wherein the position determination system is disposed between the grip and at least part of the hub.

6. The rotorcraft of claim 1, wherein the position determination system is disposed between a rotor system and a rotor mast.

7. The rotorcraft of claim 1, wherein the position determination system is configured to determine the movement of the rotor blade in six dimensions as a function of relative location of the magnets to the sensors.

8. The rotorcraft of claim 1, wherein the at least one magnet is operable to produce a first magnetic field and a second magnetic field detectable by the plurality of magnet sensors.

9. The rotorcraft of claim 8, wherein the first magnetic field corresponds with a north pole of the at least one magnet and the second magnetic field corresponds with a south pole of the at least one magnet.

10. The rotorcraft of claim 1, wherein each of the plurality of magnet sensors is operable to:
    receive an input voltage;
    detect at least one magnetic field from the at least one magnet; and
    vary an output voltage in response to the detected at least one magnetic field.

11. The rotorcraft of claim 10, wherein:
    the at least one magnet is operable to produce a first magnetic field and a second magnetic field;
    each of the plurality of magnet sensors is operable to increase the output voltage in response to detecting the first magnetic field; and
    each of the plurality of magnet sensors is operable to decrease the output voltage in response to detecting the second magnetic field.

12. The rotorcraft of claim 1, further comprising a position determining unit in communication with the plurality of magnet sensors, the position determining unit operable to:
    receive a plurality of voltage measurements from the plurality of magnet sensors; and
    determine a position of the at least one magnet based on the received plurality of voltage measurements.

13. The rotorcraft of claim 12, the position determining unit further operable to determine a position of the rotor blade based on the position of the at least one magnet.

14. The rotorcraft of claim 12, the position determining unit operable to determine the position of the at least one magnet by comparing the plurality of voltage measurements received from the plurality of magnet sensors to a plurality of voltage records, each voltage record identifying:
    a recorded position of the at least one magnet; and
    a plurality of voltage values corresponding to the recorded position of the at least one magnet.

15. The rotorcraft of claim 14, wherein the plurality of voltage values of each voltage record represent values of the plurality of voltage measurements from the plurality of magnet sensors if the at least one magnet is located at the recorded position of the corresponding voltage record.

16. The rotorcraft of claim 12, the position determining unit operable to determine a position of the rotor blade by determining the position according to an Artificial Neural Network (ANN) model of the plurality of records.

17. The rotorcraft of claim 16, wherein the ANN model comprises one or more equations that express at least some of the travel range of the at least one topography generator based on the plurality of records.

* * * * *